Feb. 20, 1951 E. C. CHAPMAN 2,542,393
APPARATUS FOR WELDING

Filed July 30, 1948 2 Sheets-Sheet 1

INVENTOR
E. Corbin Chapman
BY *Kurt Tresenfeld*
ATTORNEY

Feb. 20, 1951   E. C. CHAPMAN   2,542,393
APPARATUS FOR WELDING
Filed July 30, 1948   2 Sheets-Sheet 2

INVENTOR
E. Corbin Chapman
BY
ATTORNEY

Patented Feb. 20, 1951

2,542,393

UNITED STATES PATENT OFFICE 2,542,393

APPARATUS FOR WELDING

Edward Corbin Chapman, Lookout Mountain, Tenn., assignor to Combustion Engineering-Superheater, Inc., a corporation of Delaware Application July 30, 1948, Serial No. 41,445

1 Claim. (Cl. 219—6)

This invention relates to welding metal bodies by using electrical energy for heating said bodies and particularly to welding the ends of tubes together.

In welding metal parts together, such as tube ends, it is desirable that the tube ends after being welded together shall have substantially the same dimensions transversely of the tubes that they had previous to being welded; that is, they should not be objectionably upset by the welding process.

Heretofore tube ends were heated as by a multiplicity of flames issuing from torches which impinged upon the tube ends and brought them to welding heat. They were then brought together by pressure or impact to effect the weld. It was found however that the tube ends were upset adjacent the ends sufficiently to impair their usefulness as a commercial product. The upset was due to heating and thereby softening the tube too far back from the weld by the heating means employed.

Furthermore, the quality of the weld in pressure welding is dependent upon protection against oxidation during the heating period and absolute protection is not possible with gas heating.

It is an object of this invention to provide improved method and means for heating tube ends to a welding heat by the use of electric energy and protecting the heated metal against oxidation.

Additional objects of the invention will appear from the following description in which is set forth in detail the preferred embodiment of the invention.

Figure 1:
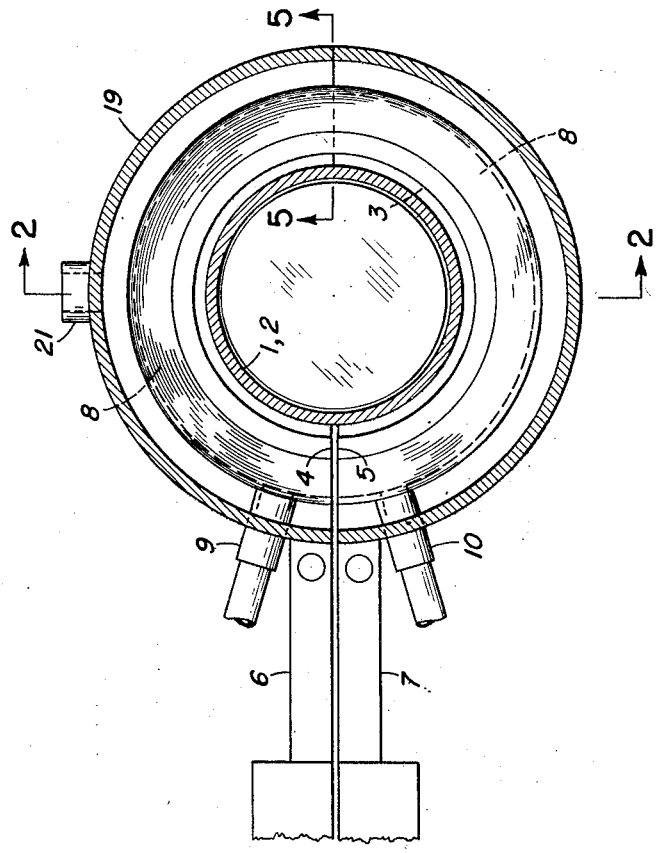
Figure 1 is a sectional elevation of my improved induction coil placed concentrically around a tube end, taken on line 1—1 of Figure 2.
Figure 2:
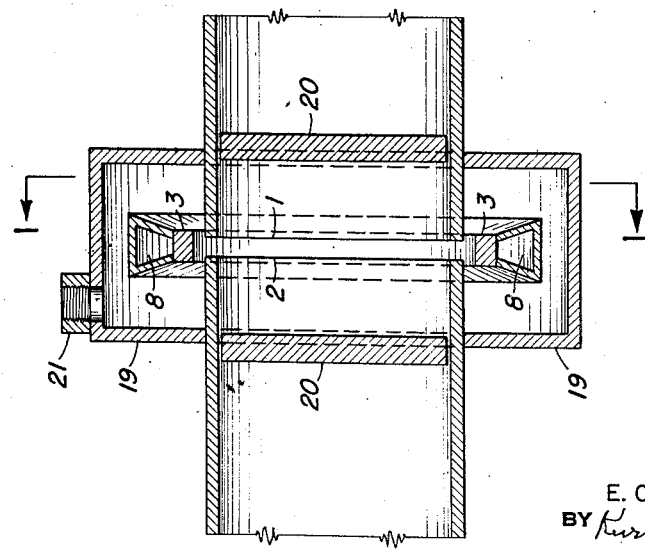
Figure 2 is a cross section through the coil taken on line 2—2 of Figure 1, or line 2—2 of Figure 3, showing the approximate position of the coil with respect to the tube ends to be welded and also showing a housing for retaining an atmosphere of non-oxidizing gas adjacent the tube ends during their heating and welding.
Figure 3:
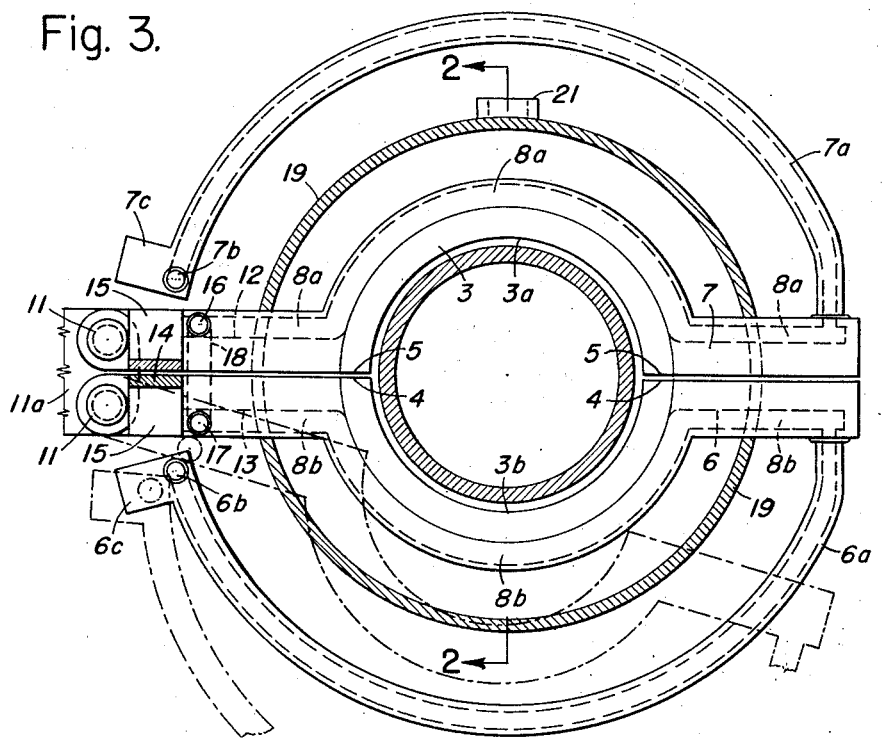
Figure 3 shows the coil of Figure 1 constructed in halves with the halves hinged for the purpose of removing the coil across the tube.

In Figures 1, 2 and 3 the tube ends 1 and 2 to be welded are mounted in alignment and may be spaced apart as approximately shown, in an apparatus not shown but well known in the art. The tubes of both ends 1 and 2 are clamped by blocks not shown provided in said apparatus one of which may be stationary and the other movable in a direction axial with the tubes, or both may be movable in said direction. In this manner the tubes may be moved axially with respect to one another so as to be initially separated and thereafter to contact for welding.

An induction coil 3, in this instance a single turn of limited width, concentrically surrounds the tube ends. The coil 3 may be made of copper in one continuous turn as shown in Figure 1 or may be made in halves as shown in Figure 3. When made in one turn, as in Figure 1, the ring portion of the coil 3 surrounding the tube ends is incomplete having spaced apart ends 4 and 5. Bars 6 and 7 extend from the coil ends and serve as terminals to which the conductors (not shown) are connected for supplying high frequency alternating electric current to the coil.

To prevent the coil or conductor 3 from overheating, it is provided with a jacket or conduit 8 through which a cooling fluid may be passed. Nipples 9 and 10 are fastened to the coil, communicate with the conduit 8 and serve as inlet and outlet connections for the cooling fluid.

When the coil is made in halves, as in Figure 3, an upper half 3a and a lower half 3b are spaced apart as at 4 and 5. To spread the halves apart they are made to rotate around pins 11 which pass through the hinges of bars 12 and 13 extending radially from the respective halves. Pins 11 are mounted on a common supporting bar 11a. To provide an effective conductor for the flow of current between bars 12 and 13 a flexible cable 14 may be provided having its ends 15 fastened to the bars 12 and 13 of the halves of the induction coil as by brazing.

The halves 3a and 3b of the coil are provided with jackets or conduits 8a and 8b through which a cooling fluid is circulated. As shown in Figure 3, conductor bars 7, 6 and 12, 13 extend in a radial direction from the ends of the coil halves 3a and 3b and are a continuation of the bar 3a and 3b of the coil. Jackets or hollow conduit 8a, 8b adjacent said conductor bars constitute a continuation of the coils 3a, 3b. At the hinged end of the coil there may be provided nipples 16 and 17 which connect conduits 8a and 8b to interconnecting hose 18 through which the cooling fluid flowing through the conduit of one half may pass into the conduit of the other half. At the outer ends of bars 6 and 7, hollow metal conduits 6a and 7a extend concentrically around the coil 3 at a spaced distance therefrom to points adjacent the hinges 11. Hollow conduits 6a, 7a are connected into conduits 8a, 8b for the delivery and removal of cooling fluid therethrough and serve also as conductors for the supply of current to the coil. The ends of conduits 6a, 7a adjacent the hinges 11 are provided with nipples 6b, 7b for cooling fluid supply and with ends 6c, 7c to which conductors for supplying current are fastened.

Current (from a high-frequency source not shown) to the coil 3 may enter conductor 7a through a connection from the supply line at 7c and thence flow serially through conductor 7a, through bar 7, through coil half 3a, through bar 12, through flexible cable 14, through bar 13, through coil half 3b, through bar 6, through conductor 6a, and through connection 6c to the supply line. Water to the coil 3 will enter at nipple 7b and thence flow serially through hollow conductor 7a, through conduit 8a, through nipple 16, hose 18 and nipple 17, through conduit 8b, and through hollow conductor 6a to exit nipple 6b.

To remove the tubes after being welded, one or both valves of the coil 3 is rotated around pins 11 into an open position; the dashed line shows the half 3b in open position. Obviously, known means may be provided to mount the induction coil 3 on the frame of the apparatus for holding and aligning the tubes by means not shown.

Preferably a housing 19 is provided as shown in Figures 2 and 3, enclosing the entire induction coil so that an atmosphere of a nonoxidizing gas, such as nitrogen, may be maintained in a compartment around the tube ends to be heated and welded. To complete the enclosure, plugs 20 of any suitable material may be provided within the tubes adjacent their ends to contain the gas. Such a housing may be made of a nonmagnetic and heat resisting material. The housing may comprise an upper and lower portion which join in a plane passing through the axis of the tubes, and may be fastened to the coil halves 3a and 3b or may be hinged adjacent the hinged end of coil 3. Nipple 21 provides connection for nonoxidizing gas which upon admission into enclosure 19 completely surrounds the tube ends during their heating period so that when same are brought together for welding under pressure the metal thereof will be practically free from any contamination from the air. Such contamination has been a weakness of prior art methods of pressure welding.

Figure 5:
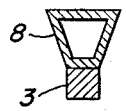
Figure 6:
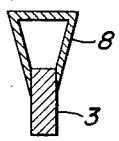
Figure 7:
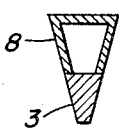

Figures 5, 6 and 7 show by way of example different forms in which the coil may be made so as to effectively heat substantially only the ends of the tubes shown at 1 and 2 (in Figures 1—2—3) or of other metallic bodies. The width of the heat band obtained, such as in the tube ends, varies directly with the width, in an axial direction, of the single turn coil.

Figure 4:
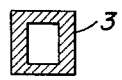
Figures 4, 5, 6 and 7 are cross sections through the coil taken on line 5—5 of Figure 1, showing different forms of the coil structure.

A section through a conventional coil known to the prior art is shown in Figure 4. This construction consists of a square copper pipe through which circulating water flows for cooling the conductor. The minimum width of coil possible with this design is approximately ½ inch for currents of the magnitude required for welding tubes of the diameter and wall thickness most frequently used in steam boilers (up to 4 inch diameter and ⅜ inch wall thickness).

In order to reduce the width of heat band, I have developed coils of special design with cross sections as shown in Figures 5, 6 and 7. In these coils, single bar conductors 3 of different shapes are used and outside water conduits or jackets 8 are provided for cooling. Within limits, the size of bar and design of water jacket can be varied depending on the size and wall thickness of tube to be welded. The variables—current, frequency and heating up time—must be taken into consideration in determining the minimum width of coil possible for each diameter and wall thickness of tube. The width of heat band is also affected by the lateral position of the coil in relation to the tube ends or by the space between the tube ends. In practice heating bands of the narrowed type made possible by my improved coils of Figures 5—6—7 are found to give excellent results.

The improved induction welding technique here disclosed further permits use of the amount of tube end separation for controlling effective heat band width (prior to bringing the tubes into abutting contact). For an induction coil 3 of given axial width, it will be seen that the axial depth of metal behind each tube end that is heated by the coil is progressively cut down as the tube end is backed away from the coil center. Hence an increase in initial tube end separation provides a further way of narrowing the depth of tube end metal that is heated inductively; and as the tube ends more closely approach one another within the coil the effective heating band width is correspondingly raised. This adds to control flexibility in a desirable way.

When welding without enclosing the welding area with a protective atmosphere as when heating with gas, the ends are normally in contact and an axial force is applied throughout the heating cycle. When welding in a protective atmosphere in accordance with the present invention, it is usually advantageous to space the tube ends apart slightly in order to allow the protective gas to fill the compartment within the tubes between plugs 20, shown in Figure 2. High frequency electric current is now applied to the coil 3 to bring the tube ends 1, 2 up to welding temperature, these heated tube ends are then abutted together to enable fusion of the end metal of one tube with that of the other tube, and in this way the weld is made without objectionable upsetting of the tube metal at the line of juncture. This absence of objectionable upsetting is made possible by keeping the width of the heat band within the narrow limits earlier mentioned.

When, as in the prior art, gas flames are used for heating the tube ends to be welded, secondary air or oxygen is supplied from the atmosphere which surrounds the flame and, although a reducing flame can be used, absolute protection from oxidation is impossible since perfect mixing of the gases is not possible. When gas heating is used, protection against oxidation from the air on the inside of the tube is best obtained by beveling the ends of the tubes from the outside in order to form an included angle of from 4 degrees to 20 degrees and applying an axial pressure during the heating period to contact the beveled edges. Complete exclusion of air depends upon several variables which are difficult to control, such as uniform pressure around the circumference of the tube and uniform heating.

For example, unequal heating will result in unequal expansion which will open gaps at the contacting edges and admit air from the inside of the tube. Equal expansion around the circumference of the tube depends on uniformity of tube wall thickness, uniformity of tube diameter, uniform flame size and close control of the joint location with respect to the center of the flame circle. These factors depend on tube tolerances, construction of the burner and frequent cleaning of the burner, all of which depend upon close inspection of material, close supervision of the welding set-up for each tube, and alertness on the part of the operator. Obviously, the uniformity of heating obtained by this prior-art method is affected by so many variables and the human element is such an important factor that consistent results can only be realized by infinite care and expert supervision.

But, with the novel induction heating technique here proposed the human element is negligible and little knowledge or training is required of the operator. Herein lies an important practical advantage.

Another important factor in obtaining a good weld in an imperfect atmosphere is the presence of residual elements such as nickel and chromium in the tube material since these elements adversely affect the weldability. They are not objectionable when the air can be excluded during the heating period, which can be accomplished by completely enclosing the joint and filling the enclosure with a non-oxidizing gas, as shown in Figure 2. This is not possible with gas heating but can be done with induction heating without interference with the heating in any way.

It may be desirable to use a combination of induction and resistance heating of the tube ends. After a partial or preliminary heating by induction to a temperature somewhat below that finally required for welding, and after the tube ends are brought together, a high current is passed through the junction of the tube ends for the purpose of increasing the temperature at the weld line. This increase may be slight or considerable, for example, if the current for resistance welding is applied after upset is started or the tube ends have come to a plastic state approaching or at welding temperature, and are held in intimate contact or are even partially welded all around, this increase in temperature due to resistance heating will be uniform all around the tube ends and beneficial to producing a homogeneous weld. One of the advantages of superimposing resistance heating as aforesaid is to effect a rapid rise in temperature at the abutting metal surfaces to produce a sharp temperature gradient which is further beneficial in reducing the amount of upset, and this is particularly important in the case of light walled tubes where it is difficult to obtain a heat band narrow enough to prevent bulging or flaring.

By using the relatively narrow coil so as to reduce the gap between the edge portions of the tube ends to be welded and by placing the tube ends with respect to the coil so that only a relatively small end portion of each tube is heated, it is possible to weld the tube ends together substantially without upset of said ends.

By providing a housing over the portions to be welded by induction a neutral atmosphere is established within, which protects the weld from oxidation. Any non-oxidizing gas may be used such as nitrogen or possibly a reducing gas.

The combination of induction and resistance heating described above, provides the novel advantages of limiting the heating of the tube ends to the relatively small end portions and heating these to a plastic state where upset has started and the tube ends are in intimate contact all around and of a uniform temperature over the entire surfaces being welded.

While the preferred embodiment of the invention has been shown and described, and while I have illustrated only tube ends to be welded, it will be understood that the ends of other metal bodies may be welded by my improved method and means and that changes in construction, combination and arrangement of parts may be made without departing from the spirit and scope of the invention as claimed.

I claim:

In apparatus for butt welding the ends of metal tubes, the combination of means for holding said tube ends in aligned relation with an initial axial separation therebetween, an induction-heating conductor of relatively narrow axial width concentrically encircling the extreme edge portions of said aligned tube ends and adapted to create when energized a narrow field of high frequency alternating magnetic flux that imparts inductive heating to substantially only said edge portions, means for pressing said thus heated tube-end edges together to effect contact and welding thereof, a housing enclosing said induction-heating conductor and the aforesaid tube ends encircled thereby, plug-like baffles inserted into the tube interiors to block substantial escape of gas therethrough, and means for admitting into said housing a non-oxidizing gas which fills into the tube-end space between said baffles so as completely to bathe the tube-end metal and thereby prevent air contamination thereof at the high temperatures encountered during said welding.

EDWARD CORBIN CHAPMAN.

REFERENCES CITED

The following references are of record in the file of this patent:

UNITED STATES PATENTS

| Number | Name | Date |
| --- | --- | --- |
| 2,024,906 | Bennett | Dec. 17, 1935 |
| 2,179,176 | Dunn | Nov. 7, 1939 |
| 2,205,425 | Leonard | June 25, 1940 |
| 2,290,338 | Koehring | July 21, 1942 |
| 2,408,229 | Roberds | Sept. 24, 1946 |
| 2,415,912 | Scherl | Feb. 18, 1947 |
| 2,480,299 | Klinke | Aug. 30, 1949 |

FOREIGN PATENTS

| Number | Country | Date |
| --- | --- | --- |
| 70,625 | Norway | July 1, 1946 |
| 70,927 | Norway | Sept. 2, 1946 |
| 585,999 | France | Dec. 20, 1924 |